United States Patent
Wolcott et al.

(10) Patent No.: US 8,956,696 B2
(45) Date of Patent: Feb. 17, 2015

(54) ULTRA-THIN MEMBRANE FOR CHEMICAL ANALYZER AND RELATED METHOD FOR FORMING MEMBRANE

(75) Inventors: Katherine A. Wolcott, Syracuse, NY (US); Shawn M. Briglin, Chittenango, NY (US)

(73) Assignee: INFICON GmbH (CH)

( * ) Notice: Subject to any disclaimer, the term of this patent is extended or adjusted under 35 U.S.C. 154(b) by 629 days.

(21) Appl. No.: 13/024,733

(22) Filed: Feb. 10, 2011

(65) Prior Publication Data

US 2012/0208004 A1  Aug. 16, 2012

(51) Int. Cl.
*B05D 3/12* (2006.01)
*B01D 5/00* (2006.01)
*B01D 29/46* (2006.01)
*B01D 63/00* (2006.01)
*B32B 3/00* (2006.01)
*H01J 49/04* (2006.01)
*B01D 69/10* (2006.01)

(52) U.S. Cl.
CPC ........... *H01J 49/0427* (2013.01); *B01D 69/105* (2013.01); *B01D 2323/26* (2013.01)
USPC ... 427/244; 210/490; 210/321.75; 428/315.7; 428/304.4; 427/240; 427/510

(58) Field of Classification Search
CPC ............... B01D 2323/39; B01D 2239/0654; B01D 71/025; B01D 71/027; B01D 67/0062; B01D 2325/04; B01D 69/10; B01D 69/12; B81C 2201/0197; B81C 2201/032; H01L 21/2885; H05K 3/241; Y02E 60/521; G03F 7/12; B05D 5/00; B05D 2210/00

USPC ............ 210/490, 500.27, 640, 321.75; 96/4; 427/244, 307, 535, 245, 532, 203, 131, 427/470, 240, 510; 216/2, 46; 424/423; 428/315.7, 304.4

See application file for complete search history.

(56) References Cited

U.S. PATENT DOCUMENTS

| 4,433,982 A   | 2/1984  | Odernheimer et al. |
| 4,943,475 A * | 7/1990  | Baker et al. ............. 442/71 |
| 5,061,301 A * | 10/1991 | Kim et al. ............. 96/12 |

(Continued)

FOREIGN PATENT DOCUMENTS

| EP | 2 060 315 A2      | 5/2009  |
| WO | WO 2006/137891 A2 | 12/2006 |
| WO | WO 2010/086630 A1 | 8/2010  |

OTHER PUBLICATIONS

A Mass Spectrometer Inlet System for Sampling Gases Dissolved in Liquid Phases; George Hoch and Bessel Kok; Archives of Biochemistry and Biophysics 101 (1963); pp. 160-170.

(Continued)

*Primary Examiner* — Ana Fortuna
(74) *Attorney, Agent, or Firm* — Hiscock & Barclay, LLP

(57) ABSTRACT

A method for forming an ultra-thin membrane for use in a chemical analyzer such as a mass spectrometer includes the step of applying a sacrificial blocking layer onto a porous substrate, applying a semi-permeable membrane layer onto the sacrificial blocking layer, and removing the sacrificial blocking layer following cure of the membrane layer. In a preferred version, at least one of the blocking layer and the membrane layer are applied to the porous support by means of spin coating, though other deposition techniques can be employed.

34 Claims, 5 Drawing Sheets

(56) References Cited

U.S. PATENT DOCUMENTS

| | | | |
|---|---|---|---|
| 5,160,627 A | 11/1992 | Cussler et al. | |
| 5,426,300 A | 6/1995 | Voss et al. | |
| 5,491,337 A | 2/1996 | Jenkins et al. | |
| 5,651,900 A * | 7/1997 | Keller et al. | 216/56 |
| 5,703,359 A | 12/1997 | Wampler, III | |
| 5,753,014 A * | 5/1998 | Van Rijn | 96/12 |
| 6,091,068 A | 7/2000 | Parfitt et al. | |
| 6,280,791 B1 | 8/2001 | Meyering et al. | |
| 6,727,498 B2 | 4/2004 | Fries et al. | |
| 7,108,813 B2 | 9/2006 | Kang et al. | |
| 7,309,385 B2 | 12/2007 | Hong et al. | |
| 7,669,719 B2 | 3/2010 | Ramaswamy et al. | |
| 7,717,271 B2 | 5/2010 | Ramaswamy et al. | |
| 7,784,621 B2 | 8/2010 | Pinnau | |
| 8,182,590 B2 * | 5/2012 | Striemer et al. | 96/4 |
| 2005/0115889 A1 * | 6/2005 | Schaevitz et al. | 210/490 |
| 2006/0249447 A1 * | 11/2006 | Yeager | 210/506 |
| 2008/0078290 A1 | 4/2008 | Hagg et al. | |
| 2008/0156188 A1 | 7/2008 | Hagg et al. | |
| 2009/0110907 A1 | 4/2009 | Jiang et al. | |
| 2009/0277837 A1 | 11/2009 | Liu et al. | |
| 2010/0233812 A1 | 9/2010 | Sun et al. | |

OTHER PUBLICATIONS

Membrane of PVA coated on porous catalytic ceramic disks supported $H_3PW_{12}O_{40}$; Qing-Lin Liu*, Qing-Biao Li; Journal of Membrane Science 202 (2002) pp. 89-95.

Polymeric micro-filter manufactured by a dissolving mold technique; Longqing Chen, Majid Ebrahimi Warkiani, Hao-Bing Liu and Hai-Qing Gong; Journal of Micromechanics and Microengineering; © 2010 IOP Publishing Ltd; 7 pgs.

* cited by examiner

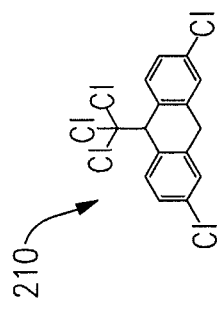
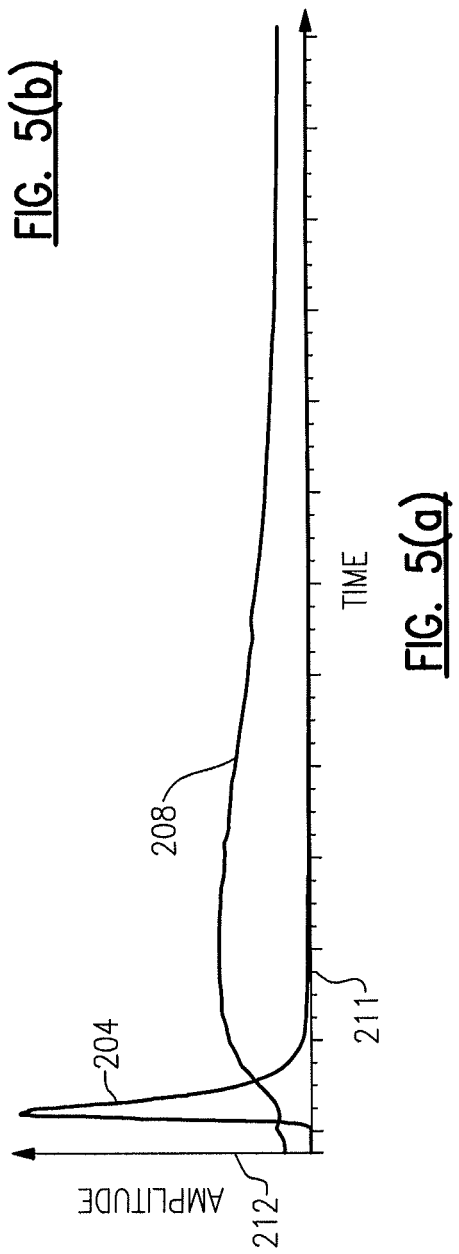
FIG. 5(b)
FIG. 5(a)

ULTRA-THIN MEMBRANE FOR CHEMICAL ANALYZER AND RELATED METHOD FOR FORMING MEMBRANE

FIELD OF THE APPLICATION

The application generally relates to the field of analytical systems and more specifically to the manufacture of an ultra-thin membrane for use in an interface assembly of a mass spectrometer.

BACKGROUND OF THE APPLICATION

The MIMS (Membrane Inlet or Interface Mass Spectrometry) method of sample introduction was first described by Hoch and Kok in 1963 and has been summarized in numerous recent articles. Most generally and according to this method, a semi-permeable membrane interface separates the gaseous or liquid sample matrix (e.g., carrier gas, ambient air, water) from the much lower pressure region that is created within a mass spectrometer. Analyte molecules pass through the semi-permeable membrane—the latter being typically formed solely from a silicone polymer—preferentially to the transport of molecules from a sample matrix. Thus and in comparison to mass spectrometry systems having direct sample inlets such as an orifice or capillary, a MIMS inlet can be operated such that it permits only a much smaller number of matrix molecules into the vacuum of the mass spectrometer for the same number of analyte molecules. This enables the construction of a mass spectrometry system having substantially the same sensitivity, but with a reduced gas load on the vacuum pumps responsible for maintaining the low pressure of the mass spectrometer. Resulting systems can be built with more robust vacuum pumps which require lower power, enabling the construction of smaller, more durable, and thus more portable mass spectrometer instruments.

MIMS instruments have demonstrated their largest commercial successes in the environmental and security fields. These applications typically require compact instruments featuring ruggedized and low-power vacuum pumping systems. Instruments of this type include, for example, the family of Mobile Mass Spectrometer instruments produced by Bruker Daltonik GmbH and the battery operated HAPSITE instruments developed by INFICON, Inc. as described in U.S. Pat. No. 5,426,300 to Voss et al. Both of these manufacturers use linear quadrupole mass filter detectors and optional gas chromatography sample introduction systems in order to provide a high sensitivity analysis for chemical warfare agents (CWA) and a wide range of toxic industrial chemicals (TICs) in a rugged package. Instruments such as those produced by Kore Technology Ltd also use a membrane inlet; however, these instruments make use of a different mass spectrometry—i.e., technology Time-of-Flight (TOF)—rather than a linear quadrupole mass filter. All of the above-noted systems take advantage of MIMS to enable the use of low speed sputter ion pumps or these pumps combined with small chemical getter pumps to enable portable or semi-portable operation. Numerous other implementations of MIMS instruments have been developed, although these have been largely relegated to research applications. One such system was developed for submersed water sampling, as described in U.S. Pat. No. 6,727,498 to Fries et al. In this latter device, the inlet membrane permits the introduction of analyte from a water matrix while withstanding the pressure of up to several hundred meters of water.

One of the major limitations of MIMS instruments stems from the reality that analyte molecules must diffuse thorough the semi-permeable membrane before entering the ion source of the mass spectrometer. Larger molecules such as pesticides, narcotics, some explosives, etc. diffuse though the membrane much more slowly than smaller molecules, such as many volatile organic chemicals (VOCs). Because of this limitation, MIMS systems—including the commercial systems mentioned above—have been largely relegated to the detection of VOCs or only the smallest semivolatile organic compounds (SVOCs). In general, SVOC compounds tend to be larger molecules than VOCs and thus diffuse more slowly through a MIMS inlet. Some success has been made in the detection of larger molecules by using much higher membrane temperatures in order to speed the diffusion process. One prior art approach involved heating the membrane directly with the photon flux from the ion source filament; however, there are limitations to using higher temperature as the sole approach. For many analytes, high temperature reduces sensitivity by lowering the analyte partition coefficient into the membrane, and for silicone membranes—the most prevalent type of semi-permeable membrane—contact with small amounts of water or oxygen at elevated temperature causes liberation of volatile silicon containing compounds. These liberated materials coat and degrade the electrode surfaces of the mass spectrometer. Additionally, higher temperature may cause labile analytes to degrade.

Moreover and even at elevated temperatures, MIMS systems typically have time responses that are too slow for use as a gas chromographic detector in applications requiring the analysis of SVOCs and other large molecules. Slow diffusion of large molecules causes peak broadening, which leads to both overlap and a reduced signal to noise ratio. The use of thinner membranes would enable faster diffusion without the problems associated with excessively high temperatures, and due to the squared dependence of diffusion time on membrane thickness, the use of thinner membranes would theoretically have a marked improvement on the time response of MIMS systems used for the analysis of SVOCs.

Although thin membranes are expected to enable higher performance MIMS in many instances, to find use in MIMS, these devices must overcome several impediments. First, the membrane must be capable of withstanding a high pressure drop without rupture. Second, the membrane must be free from pinholes or other similar defects. Third, the membrane must be constructed from materials that exhibit favorable sorption and diffusion behavior for the analyte of interest while also tolerating elevated temperatures, as required for many applications. Fourth, the membrane must not outgas vapors which themselves interfere with the detection of analyte or otherwise degrade the detection equipment.

Semi-permeable membranes are typically rubbery polymers with limited mechanical strength, yet it is essential that they withstand large pressure differentials between the matrix and the vacuum of the mass spectrometer. U.S. Pat. No. 5,703,359 to Wampler teaches a method of incorporating fibers into the membrane to improve its strength; however, it is often necessary to increase the mechanical stability of the semi-permeable membrane by use of a rigid support structure between the membrane and the vacuum of the mass spectrometer. To that end, a number of support structures have been used, wherein examples include wire mesh, photo-etched metal, deep reactive ion etched silicon, and sintered frits. In general, the smaller the size of the hole in the support structure, the better this structure supports the membrane. This technique enables the use of much thinner membranes. Improved support also enables operation with larger pressure differentials between the matrix and the mass spectrometer, which is desirable in many applications such as underwater sampling. Support structures not only prevent catastrophic rupture, but they also prevent deformation and resulting hysteresis behavior.

One candidate support material is anodized or anodic aluminum oxide (AAO). Briefly, sheets of AAO are formed by chemical etching of thin aluminum foils or films under high electric fields. A unique property is that wafers of this material can be prepared with a high density of extremely small channels (5-100 nm in diameter) extending across the support structure from one face to the other. The openings of these narrow diameter channels are sufficiently small that they enable the use of ultra-thin membranes. Using AAO, membranes could be far thinner than prior known membranes having support structures which have nominal pore sizes larger than 100 nm. The direct pathway from one face to the other also provides a more ideal flow path than the tortuous pathway through a sintered frit; however, sintered fits could in principle be composed from oriented fibers in order to produce oriented channels. Processes, such as deep reactive ion etching, can also create substrates with parallel channels, although these are of somewhat larger feature sizes. Another advantage of AAO is that this material is chemically inert and tolerant to high temperatures (>400° C.). AAO substrates are sometimes referred to as membranes; however, to avoid confusion with the semi-permeable polymeric films which actually serve the function of membranes herein, we herein generally refer to AAO material by its function herein, which is as a support structure in order to enable the use of thin semi-permeable membranes in MIMS.

AAO has found many uses, including some limited applications in MIMS. In one prior implementation, carbon nanotubes were deposited into the pores of the AAO material and used in a gas flow arrangement in which the pores are analogous to a large number of parallel capillaries. There was no thin semi-permeable membrane such as PDMS requiring solvation of analytes, followed by transport though the membrane and then release on the high vacuum side at the ion source of the mass spectrometer. A similar prior art approach in the development of a gas separation filter employs a first step of narrowing the pores of the AAO substrate and then coating the surface with a microporous gas separation layer of an inorganic polymer. In this latter case, the pores of AAO were filled with an inorganic material to narrow the pores and then spin coated over the top to create a microporous membrane. This top layer was not a semi-permeable layer such as that preferred for MIMS applications, and there was no mention of using this for the inlet of a mass spectrometer. In yet another prior art implementation, polymer films were coated onto AAO membranes, but no technique was provided to prevent this material from penetrating into the pores/channels as would be required to keep the membrane thin. The focus of this latter membrane was for use in a preparatory filtration of biological samples, such as low molecular weight proteins wherein use for MIMS was not discussed or otherwise suggested.

AAO is commercially available in 13 mm diameter disks, with a thickness of 60 microns which is much thinner than that typically possible with sintered frits; however, it is obvious that the invention described herein also extends to other nano or microporous support structures such as sintered frits, or structures created with top down lithographic techniques, such as deep reactive ion etching.

As previously mentioned above, thin membranes lack the mechanical strength required to support large pressure drops between the matrix environment and the vacuum of the mass spectrometer. This lack of strength can cause deformation, which may result in unacceptable changes in device characteristics. Thinner membranes can rupture, resulting in a loss of vacuum and damage to the mass spectrometer. Supporting structures with small feature sizes are also important in that they enable the use of thinner films and weaker membranes (i.e., polymer films that are not cross-linked).

Several methods are known for producing thin polymer films which may be suitable for use as semi-permeable membranes. Well known examples include casting, spin coating, dip coating, and certain physical and chemical vapor deposition processes. The goal of these processes is to produce thin, defect-free films. Creating the film directly on the support structure is often required for thin films because they lack the mechanical resiliency to withstand a mechanical transfer from production surface to support. Mechanical assembly techniques which involve forming the film elsewhere and then moving it to the porous support structure are typically limited to strong films with a thickness in excess of 10 µm. These steps may also create thin areas and other defects in thin membrane assemblies.

A previously developed MIMS technique did make use of an extremely thin membrane for the analysis of SVOCs. This approach used 0.5 micron thick PDMS films sputtered onto microporous polypropylene support fibers. However, in this implementation, a second counter-flowing carrier gas was used on the distal side of the membrane to capture analyte traveling through the membrane. Thus and according to this design, the membrane did not serve to separate the high pressure on the matrix side from the low pressure vacuum of the mss spectrometer. This system would thus fail to benefit from the largest advantage of a true MIMS system, which is a greatly reduced gas load on the pumping system compared to conventional inlet systems using capillaries or orifices. It is unlikely that the microporous support structure described by this latter approach would have the same strength as the nanoporous assemblies described below because the distance spanned by the membrane to cross a microscale gap is obviously larger than that to span a nanoscale gap. Additionally, it seems unlikely that polypropylene fiber would be able to withstand high temperature operation, and it would not be as chemically inert as desired for many MIMS applications.

SUMMARY OF THE APPLICATION

Therefore and according to one aspect, there is provided a method for forming an ultra-thin membrane for use in a chemical analyzer, said method comprising the steps of:
  applying a first layer onto a porous substrate;
  applying a second layer onto said first layer wherein said first layer prevents said second layer from penetrating the pores of said substrate; and
  removing said first layer.

In a preferred embodiment, a polymer film such as polyvinyl alcohol (PVA) is first cast onto a nanoporous substrate support, the latter being made from anodic aluminum oxide or a sintered frit. The first layer is cast onto the substrate support, preferably by spin coating or other deposition means wherein this polymer film serves as a blocking layer by substantially filling the pores/channels of the substrate support. The spin coating step further creates a smooth surface. In a subsequent step, an ultra-thin polymer membrane is created by spin coating or otherwise applying an elastomeric layer, such as silicone, over the smooth blocking layer. If the intermediate blocking layer were not applied, some of the elastomeric components would migrate into the pores prior to curing. This result would create a membrane having a thickness equal to the sum of the material thickness on the face of the support plus the thickness of material in the channels/pores.

In one preferred embodiment, a two-part elastomer precursor for a semi-permeable material suitable for use as a membrane layer is cast using a spincoater designed such that the resulting film preferably overlaps the edges of the support structure and extends marginally onto the opposing face of the support structure. This membrane layer is then cured and the intermediate blocking layer is subsequently removed, such as by solvation in warm deionized water. As the blocking layer dissolves away, the semi-permeable membrane layer gently settles back down onto the support structure—held in place by the overlapping features of the polymer film. This process enables the creation of thin membranes, including ultra-thin membranes having thicknesses of approximately 0.5 µm, directly on a support structure. The combined assembly of these two parts (i.e., substrate and membrane layer) is ideal for MIMS of larger molecules, such as SVOCs, with all the benefits of reduced gas load on the mass spectrometer system.

According to another aspect, there is provided an ultra-thin membrane for use in the inlet to a mass spectrometer or other chemical analyzer, said membrane being formed by the method of applying a sacrificial blocking layer onto a porous substrate; applying a permeable layer onto said blocking layer and then removing the sacrificial blocking layer.

In one version, the semi-permeable membrane layer is applied by means of spin-coating, the layer being made from a thin polymeric film, such as a silicone polymer. The sacrificial layer prevents the polymeric film from otherwise seeping into the pores of the substrate before the membrane layer has cured. Other deposition means can alternatively be utilized.

According to yet another aspect, there is provided a membrane interface assembly for a chemical analyzer, said membrane interface assembly comprising an ultra-thin membrane comprising a porous substrate and a membrane layer applied onto the porous substrate and means for applying the membrane layer to the substrate without filling the pores of the porous substrate.

In one version, the means for insuring that the membrane layer, such as silicone, does not fill the pores of the porous substrate of the membrane is the initial provision of a sacrificial or blocking layer, which is applied onto the porous substrate prior to the application of said silicone layer and removal of the sacrificial layer after the silicone layer has been cured.

The nano-scale pore size of the porous support structure advantageously serves to support a substantial pressure drop across the ultrathin membrane.

Ultra-thin membranes created directly on a rigid support structure are expected to have applications in other fields, such as in many membrane inlet ion mobility spectrometers and in numerous gas filtration applications.

Another advantage is that the formation of the herein described membranes improve the detection of various substances, such as contraband and explosive materials, using MIMS technology.

Ultra-thin and highly uniform membranes prepared as disclosed herein are also advantageous in that they can decrease the time required in fluid filtration applications. That is and for a given membrane area, higher fluxes are possible at a lower pressure differential, which can in turn increase the yield from the separation.

These and other features and advantages will become readily apparent from the following Detailed Description, which should be read in conjunction with the accompanying drawings.

BRIEF DESCRIPTION OF THE DRAWINGS

FIG. 5(a) is a graphical representation comparing the performance of a mass spectrometer having a conventional membrane with that having an ultra-thin membrane made in accordance to FIGS. 1(a)-1(d) for purposes of the detection of at least one other specific compound, depicted chemically at FIG. 5(b).

DETAILED DESCRIPTION

The following description relates to the formation of an ultra-thin membrane for applied use in membrane inlet mass spectrometry (MIMS) systems. It will be apparent from the following description that the membrane can be used suitably in other chemical analytical systems. Throughout the course of discussion, several terms such as "top", "bottom" and the like are used in order to provide a suitable frame of reference in regard to the accompanying drawings. These terms are merely intended to provide clarity and are not intended to overly narrow the scope of the invention, including the claims, except where so specifically indicated.

Figure 1A:
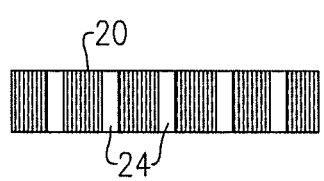
FIG. 1(a)-1(d) is a schematic drawing sequentially illustrating a method of creating an ultra-thin membrane in accordance with an exemplary embodiment.

Referring to FIG. 1(a), there is shown a porous substrate or support 20 having a plurality of pores 24. According to this specific version, the support 20 is a nano-porous substrate support such as those manufactured by Whatman Anodisc, a division of General Electric Healthcare. According to this specific embodiment, the substrate support 20 is made from Anodic Aluminum Oxide (AAO) although other materials, such as a sintered frit, could be alternatively utilized herein. A typical support could be on the order of about 60 micrometers thick, with 25-50% evenly distributed pore coverage. According to this embodiment, the pore size of the substrate support 20 is less than about 100 nanometers. This parameter can be suitably varied, from about 20 nanometers to greater than 200 nanometers, for example, depending on the application.

Figure 1B:
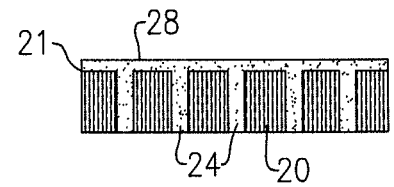

Referring to FIG. 1(b), a polymeric film layer 28 such as polyvinyl alcohol (PVA) is initially applied onto the top surface 21 of the support 20. According to this embodiment, the film layer 28 is applied to the substrate support 20 by means of spin coating wherein this film serves as a sacrificial blocking layer, which substantially fills each of the pores 24 of the support 20 and further provides a relatively smooth working outer surface. This film thickness can range from a fraction of a micrometer to several micrometers with a thicker film serving to better mask any rough features in the underlying support 20. While spin coating is described as a preferred technique, the polymeric film layer 28 can be applied by other deposition means, such as physical vapor deposition, dip coating, and chemical vapor deposition, among others.

The first layer material can be further defined, for example, as a patternable photoresist, provided the layer material includes properties enabling its removal without otherwise affecting a second membrane layer, as now described herein.

Figure 1C:
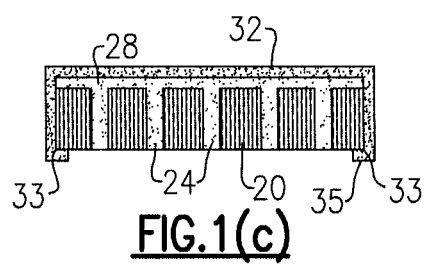

Referring to FIG. 1(c) and following hardening of the polymeric film layer 28, a semi-permeable polymeric membrane is cast by spin coating or otherwise depositing a second layer 32 over the smooth blocking layer 28 and then curing this layer. Preferably, the second layer 32 is made from a silicone polymer. In this preferred embodiment, a two-part PDMS elastomer precursor (i.e., Sylgard 184, manufactured by Dow Corning Corporation) is utilized although other materials, such as a photoresist, could be used. The underlying blocking layer 28 prevents any of the uncured silicone components from seeping into the pores 24 of the support 20 and therein creates a semi-permeable ultra-thin silicone membrane with smooth upper and lower surfaces. The blocking layer 28 need not fully fill the pores 24 of the underlying support 20 provided that the upper portions of each pore 24 are filled at a minimum.

In the preferred embodiment, the second layer 32 is cast using a spin coater designed such that the resulting film marginally overlaps the edges of the bottom surface 33 of the substrate support 20 and forms a bottom face 35 thereof. According to this specific embodiment, the two-part elastomer is then cured in air for 1 hour at about 100° C. It should be noted that other deposition techniques (physical vapor deposition, dip coating, chemical vapor deposition, among others) could also be alternatively employed to apply the second layer 32.

Figure 1D:
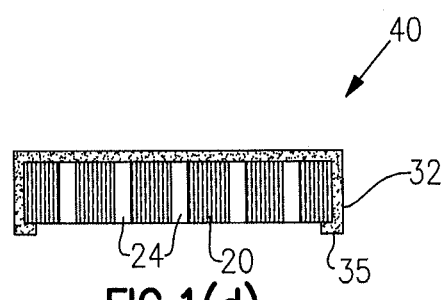

Referring to FIG. 1(d), the intermediate blocking layer 28 is subsequently removed. In one version, the blocking layer 28 is dissolved in an appropriate solvent, such as warm deionized water. According to one version, water is heated to 70-80° C. for approximately 2 hours. The pores 24 in the nano-porous support 20 are caused to open wherein the ultra-thin membrane layer 32 settles undamaged onto the support 20 even with the removal of the sacrificial layer 28 due to the retention of the bottom face 35 of the membrane layer 32 against the bottom surface 33 of the substrate and the elastomeric properties of the membrane material. A mechanical assembly such as a clamp (not shown) can also be used in order to effectively retain the membrane 32 in place during this dissolving step. In this embodiment, the nano-scale pore size of the anodic aluminum oxide support 20 serves to support large pressure drops across the as-formed ultra-thin membrane, labeled as 40.

It should be noted that other removal means are possible. For example, the blocking layer could be made from a low molecular weight wax, such as Apiezon wax. The wax, as applied to the porous support 20, would fill or substantially fill the pores 24 but could be melted away without the need for a dissolving step.

Moreover, the first layer 28 need not be polymeric. For example, a small molecule such as camphor could be spin coated onto the substrate support 20 from a solution to fill the pores 24 in a manner similar to the polymer wherein this first layer could be removed through sublimation by simply reducing the ambient pressure (or adding heat or both) to leave the intact silicone membrane.

Still further, the blocking polymer could decompose thermally at low temperature relative to the deposited silicone membrane. Silicone is very thermally stable. It is well known that carbon-carbon bonds are less thermally stable than silicon-oxygen bonds that comprise the silicone back bone structure. Most other polymers have carbon-carbon bonds and would therefore be less thermally stable. Heat plus oxygen would cause their decomposition. Ashing techniques, such as microwave plasma systems, are also well known via the semiconductor field and are used to remove photoresists. These may be tunable such that they only remove the less stable polymer under layer from beneath a cured over layer. Other variations are possible, as contemplated herein.

Figure 2B:
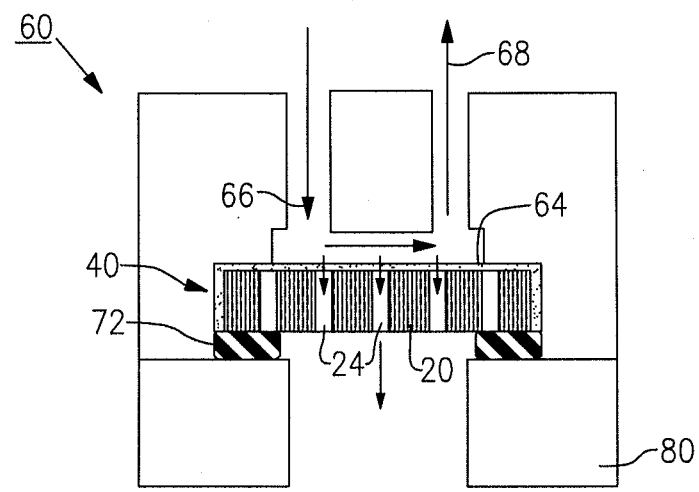
FIG. 2(b) illustrates a partial view, shown in section, of a mass spectrometer interface assembly for use in the MIMS system of FIG. 2(a) and including an ultra-thin membrane created according to FIGS. 1(a)-1(d)
Figure 2A:
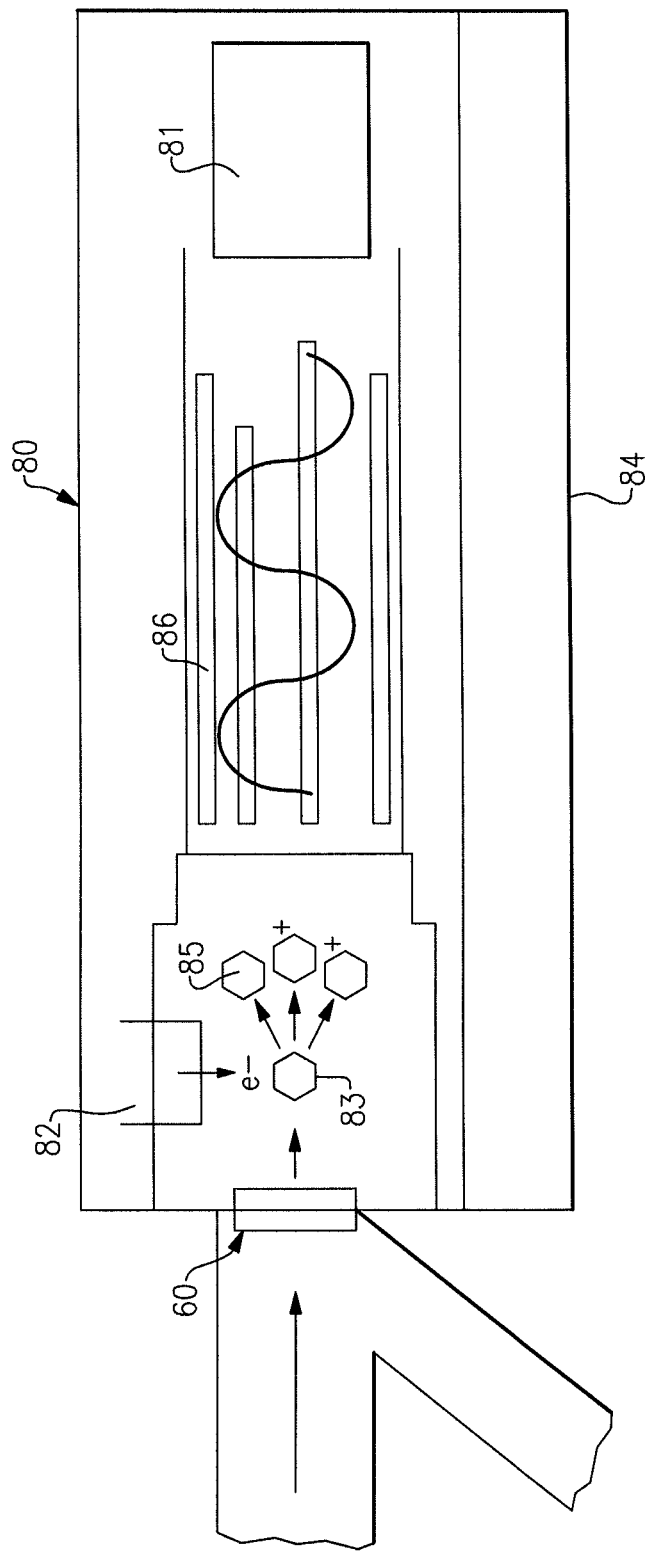
FIG. 2(a) is a generalized schematic view of a MIMS system.

Referring to FIG. 2(a), a MIMS system is shown schematically in which a membrane assembly 60 is positioned at the inlet of a mass spectrometer, herein labeled as 80. The mass spectrometer 80 is defined by a housing 84 that includes an ion source 82 positioned at the inlet side of the housing wherein the ion source includes a filament (not shown) or other means for producing a stream of electrons 83 that are injected into an ionization volume or chamber along with a sample gas which passes through the membrane assembly 60 at the inlet of the mass spectrometer 80. Impact by the electrons 83 with the incoming gas molecules produces the formation of positive ions 85 that are caused to be accelerated into a mass filter 86, such as a quadrupole mass filter, in which masses are scanned for detection by a sensor 81, such as an electron multiplier or a Faraday cup, which is disposed at the opposite end of the housing 84. An exemplary mass spectrometer is described in U.S. Pat. No. 6,091,068, the entire contents of which are herein incorporated by reference, although other similar devices can be utilized herewith.

An interface assembly 60 for the mass spectrometer 80 is shown in FIG. 2(b) for use with an ultra-thin membrane 40, such as manufactured in FIGS. 1(a)-1(d). More specifically, the ultra-thin membrane 40 comprising the semi-permeable layer 32 and nano-porous substrate support 20 is supported within a receiving cavity 64 of the interface assembly 60 and positioned such that the semi-permeable membrane layer 32 is disposed in relation to the carrier gas flow and excess flow of the mass spectrometer 80, shown schematically by arrows 66, 68, respectively, and opposite the ion source 82, FIG. 2(a). The interface assembly 60 can be provided within the wall of the spectrometer housing 84, FIG. 2(a), or alternatively be attached thereto. An 0-ring, gasket or other seal element 72 fluidly seals the membrane 40 within the receiving cavity 64 of the interface assembly 60 relative to the mass spectrometer 80.

Figure 3:
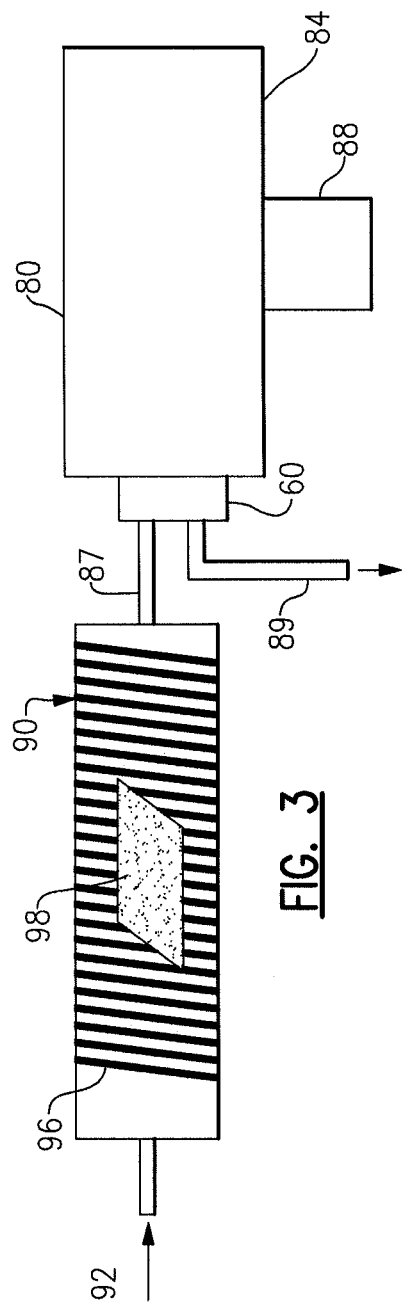
FIG. 3 is a schematic view of a mass spectrometer having the membrane interface assembly of FIG. 2, as used in conjunction with an exemplary detection apparatus.

An apparatus employing the above interface assembly 60 is depicted in FIG. 3 as part of an apparatus for use in the detection of explosives and/or other contraband materials, such as at an airport, border station or other similar facility. Schematically, the apparatus is used in conjunction with the interface assembly 60 as an inlet to mass spectrometer 80, the latter being defined by a housing 84 supporting an ion source. A vacuum pump 88 is connected to the housing 84 of the mass spectrometer 80 by conventional means.

Still referring to FIG. 3, a test or detection chamber 90 retains at least one sample 98 for introduction and detection of contraband or other target materials. According to this embodiment, a gas source is disposed in relation to the detection chamber such that a gas flow 92 is established across a retained sample 98. According to this embodiment, a set of resistive heater wires 96 are wrapped about the exterior of the housing of the detection chamber 90 in order to flash heat the sample 98. The resulting gas flow 92 across the sample 98 is directed as an inlet 87 into the membrane interface assembly 60, wherein the exhaust 89 of carrier gas is vented away, or in the case where air is drawn through the device for use as a carrier gas, this is connected to a sample pump (not shown) to draw the flow of air through the device.

Figure 4A:
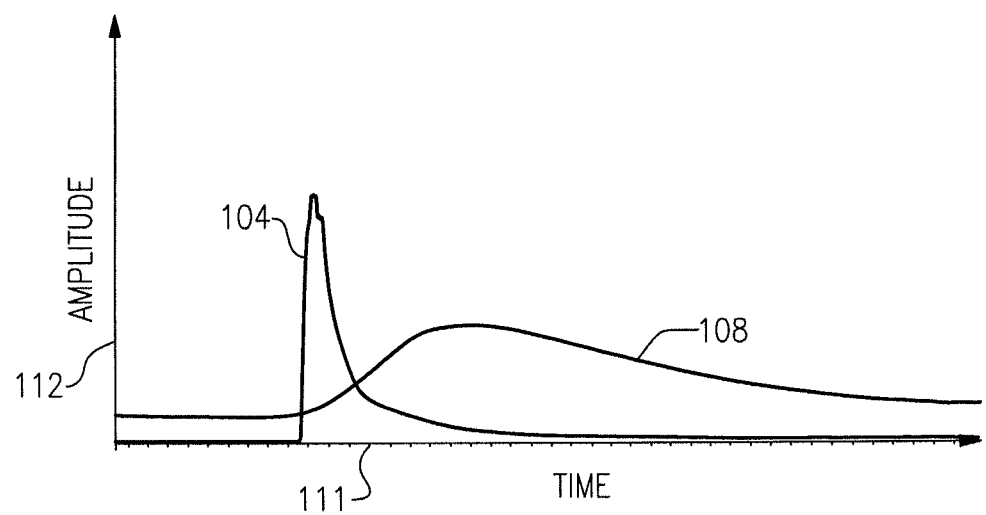
FIG. 4(a) is a graphical representation comparing the performance of a mass spectrometer having a conventional membrane with that having an ultra-thin membrane made according to FIGS. 1(a)-1(d) for purposes of the detection of at least one specific compound, the compound depicted chemically at FIG. 4(b)
Figure 4B:
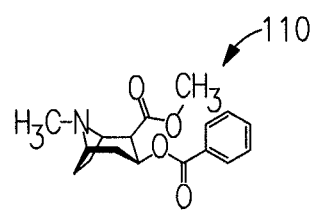

Referring to FIGS. 4 and 5, comparative sets of test data are herein provided for different compounds in terms of detection to further depict the efficacy of the herein described membrane. For purposes of the FIG. 4(a) test, a 0.5 μL aliquot of a methanol cocaine standard solution was deposited on a sample wipe or "swipe", made of a stainless steel mesh (500 ng of cocaine was deposited). This swipe is intended to simulate the sample that would be collected by swiping a mesh swipe across a target of interest (e.g., a laptop computer, cell phone, etc.). The solvent was allowed to evaporate and then the swipe was placed within a swipe desorber oven 90. This apparatus consisted of a thin-walled glass tube having a coaxial heater wire coil thereabout. The heater was connected to a programmable DC power supply under the control of a LabVIEW (National Instruments) computer program designed to pulse the voltage across the heater wire over a predetermined time. In this test, the voltage was pulsed for four (4) seconds to rapidly bring the interior of the desorber chamber to a temperature of about 400° C. This heat pulse desorbed the cocaine sample into a stream of nitrogen carrier gas (6 ml/min), where it was carried to the membrane inlet of a mass spectrometer that included the assembly of FIG. 2(b). In this first example, a graphical comparison of response for cocaine (the latter's chemical structure being shown in FIG. 4(b)) by the mass spectrometer 80 is comparatively illustrated in FIG. 4(a) with that of a conventional 50 micron thick PDMS membrane, wherein amplitude (Y-axis, 112) is measured versus time (X-axis, 111). According to this specific example and as scaled, every fourth tick mark along the X-axis 111 is representative of 15 seconds. As illustrated by each of the graphically depicted output 114 vs. output 118, the response for cocaine is dramatically improved using the herein described ultra-thin membrane 40, FIG. 1(d).

Similarly, the detection of DDT is comparatively illustrated according to FIG. 5(a) wherein the chemical composition of DDT 210 is shown diagrammatically according to FIG. 5(b). For this test, a 0.5 μL aliquot of a DDT solution in methanol was deposited onto a plug of silane treated glass wool and the solvent was allowed to evaporate in the desorber chamber 90 previously described in regard to the test at FIG. 4(a), 4(b). A total of 500 ng of DDT was deposited. This test was intended to simulate the sampling of a pesticide using a glass swab. A LabVIEW programmed temperature pulse was used to quickly ramp the temperature up to about 300° C. to desorb the DDT from the glass wool. The total time of heater pulse was four (4) seconds. Nitrogen carrier gas (6 ml/min) pushed the sample through heated connections and to the membrane inlet of the mass spectrometer, as in FIG. 2(d). For this experiment, the membrane was also heated to 120° C. In the graphical results of FIG. 5(b), amplitude (axis 212) is determined over time (axis 211). As in the preceding, a conventional 50 micron thick PDMS membrane is compared graphically to an ultra-thin membrane 40, FIG. 1(d), which is made in accordance with the present application according to outputs 208, 204, respectively, clearly providing superior results using the membrane 40.

In addition to the foregoing, the following is an exemplary, but not exhaustive list of target compounds or materials, which are suitable for detection and analysis using the herein-described MIMS technology described, including the above interface assembly:

A. Chemical Warfare Agents (CWAs)
  i). Nerve agents such as sarin, cyclosarin, soman, tauban, VX and Russian VX;
  ii). Blistering agents such as sulfur mustard, nitrogen mustards and lewisite.

B. Explosive-Related Compounds
  i). Compounds such as TNT, RDX, HMX, Tetryl, PETN, nitroglycerine, triacetone triperoxide, hexamethylene triperoxide diamine, ammonium nitrate fuel oil; and
  ii). Signature compounds such as dinitrotoluenes, nitrobenzene, aminonitrotoluenes, nitroanilines, hexamine, detection taggants such as EGDN, DMNB, o-MNT, p-MNT.

C. Industrial Pollutants
  i). Pesticides and herbicides; for example, methyl tert-butylester (MTBE), 2.4D, 2,4,5-TP (Silvex), acrylamide, alachlor, benzoapyrene, carbofuran, chlordane, dalapon, di 2-ethylhexl adipate, di 2-ethylhexyl phthalate, dibromochloropropane, dinoseb, dioxin (2,3,7,8-TCDD), diquat, endothall, endrin, epichlorohydrin, ethylene dibromide, glyphosate, hepthachlor, hepthachlor epoxide, hexachlorobenzene, hexachlorocylclopentadiene, lindane, methoxychlor, oxamyl [vydate], PCBs [polychlorinated biphenlys], pentachlorophenol, picloram, simazine, and toxaphene.
  ii). Certain exemplary volatile industrial pollutants would also exhibit improved detection performance in using the herein described MIMS technology: Benzene, carbon tetrachloride chlorobenzene, o-dichlorobenzene, p-dichlorobenzene, dichloromethane, 1,2-dichloroethane, 1,2-dichloropropane, ethylbenzene, styrene, tetrachloroethylene, 1,2,4-trichlorobenzene, 1,1,1-trichloroethane, 1,1,2-trichloroethane, trichloroethylene, toluene, vinyl chloride, and xylenes.

D. Narcotics and Drugs of Abuse
  Cocaine, morphine, ketamine, codeine, nicotine, amphetamine, methamphetamine, caffeine, barbital.

PARTS LIST FOR FIGS. 1-5(b)

20 nano-porous support (substrate)
21 top surface
24 pores
28 sacrificial layer
32 semi-permeable membrane layer
33 edges of bottom surface
35 bottom face
40 membrane, ultra-thin
60 interface assembly
64 receiving cavity
66 arrow—carrier gas flow
68 arrow—excess flow
72 seal element
80 mass spectrometer
81 sensor
82 ion source
83 electrons
84 housing
85 ions
86 mass filter
87 inlet—interface assembly
88 vacuum pump
89 exhaust—interface assembly
90 detection (desorber) chamber
92 gas inlet (flow)
96 resistive heater wires
98 sample
104 graph—output
108 graph—output
110 chemical composition
111 X-axis
112 Y-axis 204 graph—output
208 graph—output
210 chemical composition
211 X-axis
212 Y-axis It will be readily understood that numerous modifications and variations are possible within the intended ambits of this application, as now described by the following claims. Though mass spectrometers have been discussed in specific detail, it will be apparent that these techniques can further be applied to other analytical systems, including ion mobility spectrometers (IMS), such as those described for example in U.S. Pat. No. 5,491,337, the entire contents of which are herein incorporated by reference.

The invention claimed is:

1. A method for forming an ultra-thin membrane for use in an inlet portion of a chemical analyzer, said method comprising the steps of:
    applying a first layer onto a porous substrate;
    applying a second layer onto said first layer wherein the pores of said substrate are not filled by said second layer; and
    removing said first layer wherein said first layer is a sacrificial layer and said second layer is a semi-permeable membrane layer.

2. A method as recited in claim 1, wherein the pore size of said substrate is less than about 100 nm.

3. A method as recited in claim 1, wherein said first layer is applied onto said porous substrate by means of spin coating.

4. A method as recited in claim 1, wherein said first layer comprises a polymer film, said first layer having solubility properties permitting its removal without removing the second layer.

5. A method as recited in claim 1, wherein at least one of said first layer and said second layer are applied using spin coating deposition.

6. A method as recited in claim 1, wherein said porous substrate comprises anodic aluminum oxide.

7. A method as recited in claim 1, wherein said substrate comprises a frit constructed from at least one of largely parallel sintered metal, glass or ceramic fibers.

8. A method as recited in claim 1, wherein said first layer comprises a water soluble polymer.

9. A method as recited in claim 1, wherein said first layer material comprises a patternable photoresist, said first layer having properties permitting its removal without removing the second layer.

10. A method as recited in claim 1, wherein said second layer material comprises a patternable photoresist.

11. A method as recited in claim 8, wherein said first layer is polyvinyl alcohol.

12. A method as recited in claim 1, including the additional step of maintaining the membrane layer on said substrate during removal of said first layer.

13. A method as recited in claim 1, wherein said chemical analyzer is a mass spectrometer.

14. A method as recited in claim 1, wherein said chemical analyzer is an ion mobility spectrometer.

15. An ultra-thin membrane for use in a chemical analyzer, said membrane comprising a porous substrate and a semi-permeable membrane layer applied to the porous substrate, the membrane being formed by the method of:
    applying a sacrificial layer onto the porous substrate, said porous substrate being made from one of the group consisting of anodic aluminum oxide, sintered frit, a structure that is created by top down lithographic techniques such as deep ion etching, and any nanoporous or microporous support with largely parallel channels;
    applying the semi-permeable membrane layer onto said sacrificial layer; and then
    removing said sacrificial layer such that only the semi-permeable membrane layer and the porous substrate remains, wherein the semi-permeable layer is caused to lie directly upon the porous substrate, but without filling the pores of the porous substrate and wherein the applied semipermeable membrane layer has a thickness of one micron or less in an active area covering the porous substrate.

16. A membrane as recited in claim 15, wherein the pore size of said porous substrate is less than about 100 nanometers.

17. A membrane as recited in claim 16, wherein said sacrificial layer is polymeric, said sacrificial layer having solubility properties permitting its removal without removing the second layer.

18. A membrane as recited in claim 17, wherein said semi-permeable membrane layer comprises silicone.

19. A membrane as recited in claim 15, wherein said chemical analyzer is a mass spectrometer.

20. A membrane as recited in claim 15, wherein said chemical analyzer is an ion mobility spectrometer.

21. A membrane as recited in claim 15, wherein at least one of said sacrificial and semipermeable membrane layers are applied by spin coating.

22. A membrane as recited in claim 15, wherein said membrane layer is attached onto one side of the substrate and in which a portion of the membrane layer extends over a portion of an opposite side of the substrate.

23. A membrane as recited in claim 15, wherein the frit is constructed from at least one of largely parallel sintered metal, glass or ceramic fibers.

24. A membrane interface assembly for a chemical analyzer, said assembly comprising:
    an ultra-thin membrane comprising a porous substrate having a thickness of less than about 100 μm in an active region thereof, the pores of the substrate being between about 20-200 nm, and a semi-permeable membrane layer applied onto the porous substrate wherein the semi-permeable membrane layer has a thickness of about one micron or less, and which is in direct contact with the porous substrate without penetrating the pores of the porous substrate and with no intermediate layers therebetween.

25. A membrane interface assembly as recited in claim 24, wherein said assembly further includes a receiving cavity sized for accommodating said membrane and at least one sealing element.

26. A membrane interface assembly as recited in claim 24, wherein said membrane layer is made from a curable material, said assembly being made by the method including the steps of:
    applying a sacrificial intermediate layer made from a water soluble polymer onto said substrate, said sacrificial intermediate layer serving to block the membrane layer from the pores of said substrate;
    applying the semi-permeable membrane layer onto said sacrificial layer; and
    removing the sacrificial intermediate layer after the semi-permeable membrane layer has cured.

27. A membrane interface assembly as recited in claim 26, wherein at least one of said intermediate layer and said membrane layer are applied to said substrate by means of a spin coater.

28. A membrane interface assembly as recited in claim 26, wherein said membrane layer and said sacrificial layer are each applied onto one side of the substrate and in which a portion of the membrane layer attaches to at least a portion of an opposite side of the substrate.

29. A membrane as recited in claim 24, wherein said membrane layer is made from a semi-permeable polymer.

30. A membrane interface assembly as recited in claim 29, wherein said membrane layer is made from silicone.

31. A membrane interface assembly as recited in claim 24, wherein said chemical analyzer is a mass spectrometer.

32. A membrane interface assembly as recited in claim 24, wherein said chemical analyzer is an ion mobility spectrometer.

33. A membrane interface assembly as recited in claim 24, wherein the porous substrate is made from one of the group consisting of anodic aluminum oxide, sintered frit, a structure that is created by top down lithographic techniques such as deep ion etching and any microporous or nanoporous support with largely parallel channels.

34. A membrane interface assembly as recited in claim 33, wherein the frit is constructed from at least one of largely parallel sintered metal, glass or ceramic fibers.

\* \* \* \* \*